Nov. 8, 1938.  C. H. H. RODANET  2,135,951
WINDSHIELD LIFTING DEVICE
Filed July 30, 1936   2 Sheets-Sheet 1
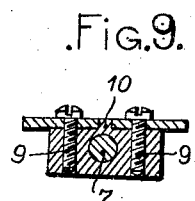
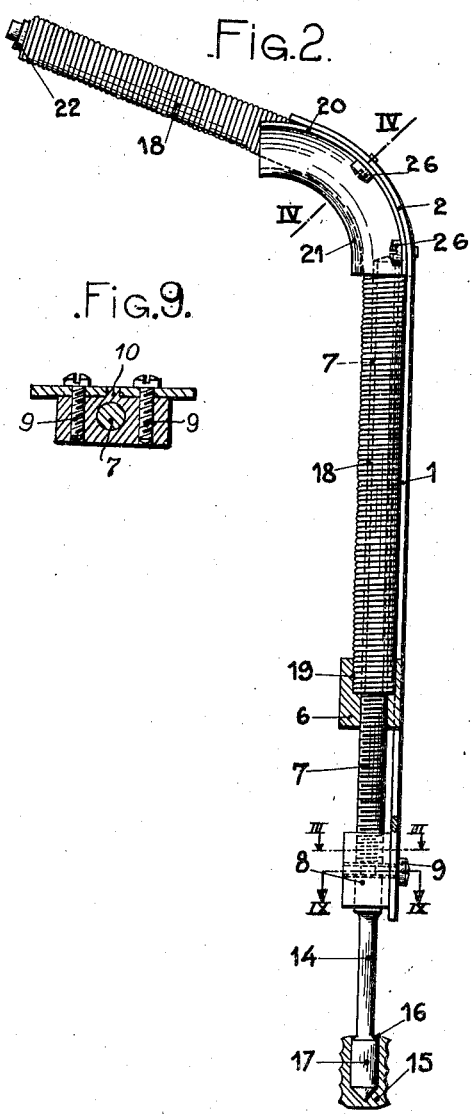
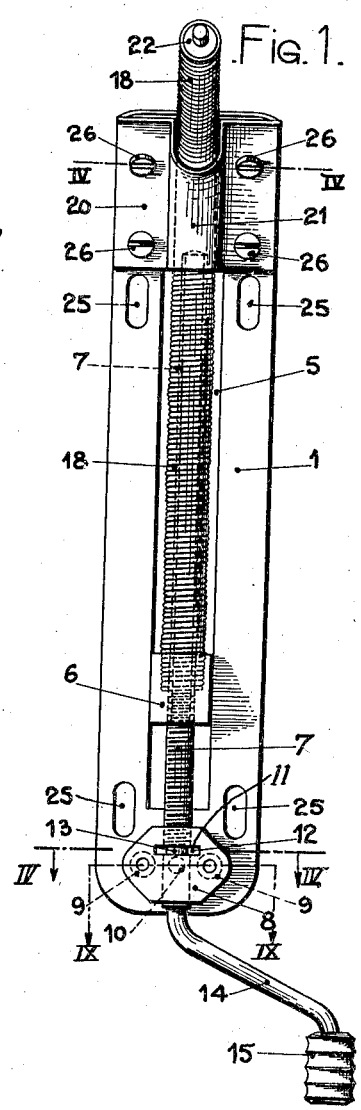
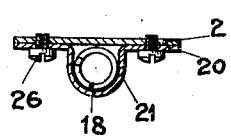
INVENTOR:
CHARLES HILAIRE
HENRI RODANET
BY Haseltine, Lake & Co.
ATTORNEYS

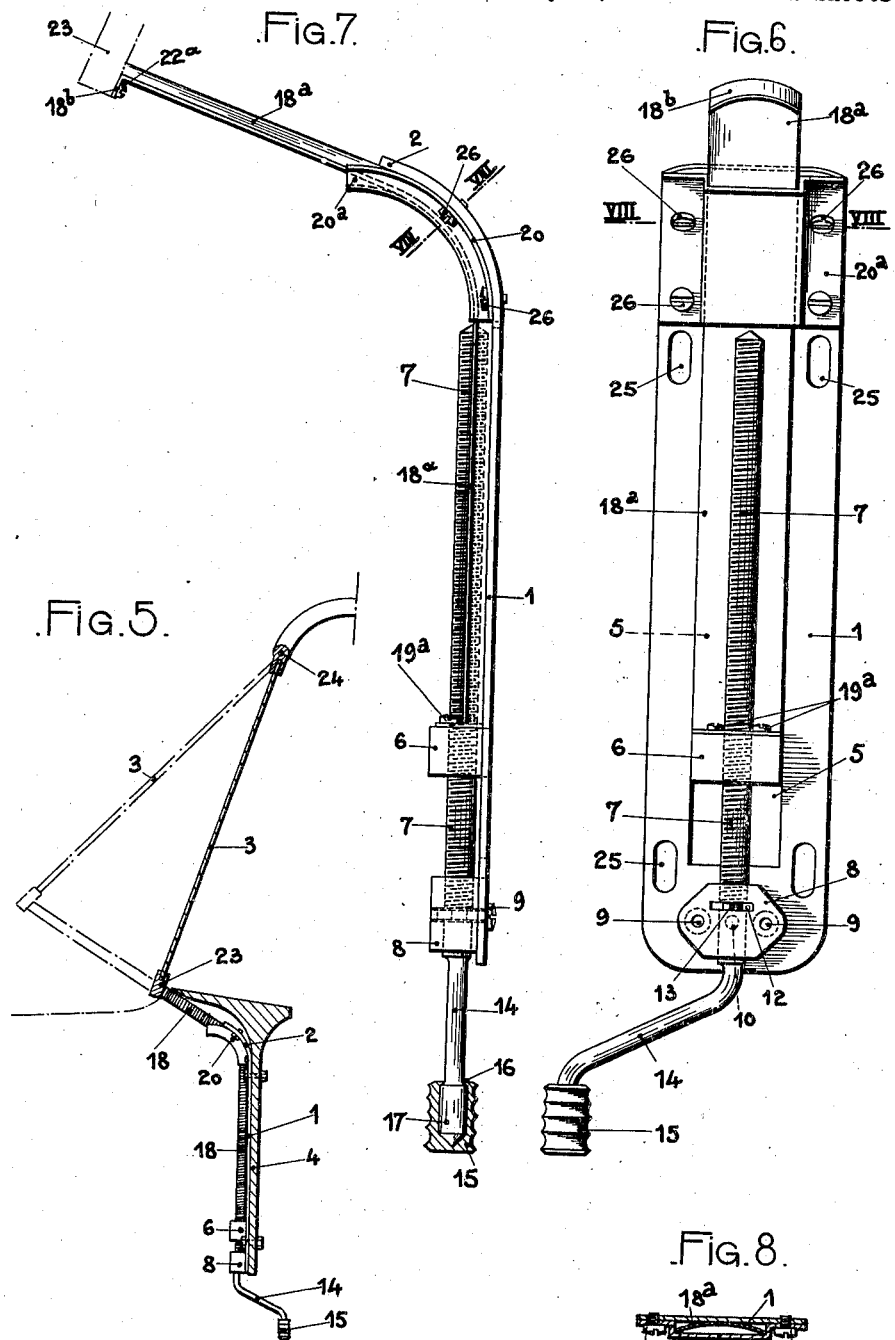

Patented Nov. 8, 1938

2,135,951

UNITED STATES PATENT OFFICE 2,135,951

WINDSHIELD LIFTING DEVICE

Charles Hilaire Henri Rodanet, Neuilly-sur-Seine, France, assignor to Société Anonyme: Etablissements Ed. Jaeger, Levallois-Perret (Seine), France Application July 30, 1936, Serial No. 93,425
In France July 9, 1936

3 Claims. (Cl. 296—84)

This invention relates to a window-lifting device particularly applicable to the operation of the pivoting glass plates constituting the windshield of motor vehicles, and it is particularly characterized by the fact that the device is constituted by a flexible member connected, on the one hand, to the glass plate, and, on the other hand, to a movable slide-block, the free end of said flexible member being set in the suitable direction through the medium of an arcuate guide surrounding this member and compelling it to resiliently distort.

The invention further relates to a number of detail objects constituent of the main object and applied separately or according to any combinations.

(1) The flexible member is constituted by a helical spring the turns of which are preferably in contact together.

(2) The flexible member is constituted by a spring leaf having preferably a slightly arcuate section.

(3) The slide-block, to which the flexible member is secured, is constituted by the nut of a screw and nut system in which the screw is axially fixed, whilst the nut is suitably guided, in order to be prevented from rotating.

(4) The guide for the flexible member is constituted by the suitably curved end of the support of the apparatus, on which end a guide fits and is secured, said guide being formed by a correspondingly curved member having such a section that it embraces said flexible element for compelling it to curve so as to conform to the end of the support.

The accompanying drawings, given by way of example only, show two forms of construction of a wind-shield lifting device according to the invention.

Fig. 1 is an elevation of a first form of construction.

Fig. 2 is a side view, with partial sections, corresponding to Fig. 1.

Fig. 3 is a section made according to line III—III of Figs. 1 and 2.

Fig. 4 is a section made according to line IV—IV of Figs. 1 and 2.

Fig. 5 diagrammatically illustrates the fitting up of the wind-shield lifting device according to Figs. 1 to 4 on the instrument board of a motor vehicle.

Fig. 6 is an elevation of a second form of construction.

Fig. 7 is a side view, with partial axial sections, corresponding to Fig. 6.

Fig. 8 is a section made according to line VIII—VIII of Figs. 6 and 7.

Fig. 9 is a section made according to line IX—IX of Figs. 1 and 2.

In the various figures of the drawings, the same reference numbers designate like parts or parts fulfilling the same function.

The wind-shield lifting device, illustrated in Figs. 1 to 5, is composed of a support or plate 1, of substantially rectangular shape and one of the ends of which is curved at 2 according, substantially, to an arc of circle the angle of which, at the center, is so determined that the tangent to the end is substantially directed according to the chord sub-tending the arc of maximum or mean opening of the glass plate 3 of the vehicle, when the plate 1 is secured on the rear face of the instrument board 4 of the vehicle, as will be explained later on. This plate 1 is provided, in its plane portion and according to its longitudinal axis, with an aperture 5 of substantially rectangular shape. This aperture 5 serves as a guide for a slide-block 6 of parallelepipedon shape, having, according to its axis parallel to the axis of aperture 5, an internally screw-threaded hole in which is screwed a screw-threaded rod 7 of suitable length, axially held by any suitable means. In the form of construction illustrated, the end of this screw-threaded rod is smooth and journalled in a support or bearing 8 secured, by screws 9, to the end of the plate 1. In order that the bearing 8 should be suitably centered on the support 1 on which it is secured, this bearing 8 is provided, on its face in contact with said support 1, with a projection or stud 10 which fits into a perforation of corresponding shape formed in this support 1.

For axially holding the screw threaded rod 7, this rod is provided with a circumferential groove 13 which, the screw threaded rod 7 being in position in the bearing 8, is located opposite a slot 11 formed in said bearing 8. This slot 11 is substantially at right angles to the axis of the screw threaded rod 7. Within this slot is arranged a U-shaped yoke 12 the two side branches of which enter the circumferential groove 13 provided in rod 7. The yoke 12 is held in position in the slot 11 owing to the fact that being inserted in the bearing 8 on the side which is in contact with the face of the support 1, this support prevents said yoke 12 from coming out of the slot 11 when the bearing 8 is secured, by means of the screws 9, on said support.

For facilitating the rotation of rod 7, the latter terminates, at its end adjacent to the bearing 8, in a crank 14 which is secured in position or is rigid with said screw-threaded rod 7. The crank pin or handle 15 of this crank is constituted by a cylindrical blind socket loosely mounted on the corresponding portion 17 of the crank and axially held by beading or the like at 16.

On the slide-block 6 is secured, by any suitable means, the flexible member controlling the glass plate; in this example, said flexible member is constituted by a helical spring 18, the turns of which are preferably in contact with each other and one of the ends of which is connected to the slide-block 6 by forcibly screwing in a corresponding axial screw-threaded hole 19 formed in this slide-block 6. This spring 18 is guided, on the side adjacent to its free end, by a member 20 which is applied and secured, by any suitable means, such as screws 26, on the curved end 2 of plate 1. This member 20 has a trough-like cross section so that its central portion 21 having a semi-circular section serves as a guide for spring 18 and compels the latter to press against the end 2 of plate 1 for conforming to the curvature of the same. To the end of this spring 18 is secured a stud 22 which is connected to the glass plate or to the frame 23 of the latter which it is desired to operate. This stud 22 is forcibly screwed within the spring 18 and is riveted on the lower part of the frame 23 of the glass plate which is jointed at 24, at its upper part, to the carriage body.

From the foregoing, the operation will be easily understood. When the user turns the crank 14, he causes the rotation of the screw-threaded rod 7 and, consequently, the axial displacement of slide-block 6 which is prevented from rotating owing to the fact that it is guided in the aperture 5. The spring 18 axially moves, thereby causing the opening or closing of the glass plate according to the direction of displacement of this spring. It will be understood that, owing to the transverse resiliency of this spring 18, it can easily adapt itself to the slight displacements relatively to the initial direction of its point of attachment to the pivoted glass plate. Moreover, owing to its resiliency in the axial direction, when a pull is exerted on said spring, it will be seen that the glass plate in closing position is resiliently pressed against its support, this being particularly advantageous for avoiding violent shocks on the glass plate produced by jolts of the vehicle, as well as for ensuring perfect fluid-tightness between the glass plate and the fixed frame of the vehicle body.

The plate 1 is secured on the rear face of the instrument board of the vehicle by any suitable means, such as screws or bolts, which pass through perforations 25 provided in said plate 1. In order to allow of adjusting the position of this plate 1, said perforations 25 are of elongated shape in the axial direction of this plate 1.

In the form of construction illustrated in Figs. 6, 7 and 8, alone the construction of the flexible member and the shape of the guide of this member differ and, from this fact, they will alone be described.

The flexible member is constituted by a spring leaf or the like 18a, the cross section of which is preferably slightly arcuate in order to increase the rigidity of the same when this spring leaf 18a is subjected to a compression stress directed according to its direction. One of the ends of this spring leaf 18a is secured to the slide-block 6 by screws 19a or the like. Near its other end, said spring leaf 18a is guided, on the one hand, by the curved end 2 of plate 1 and, on the other hand, by a member 20a which is secured by screws 26 on the curved end 2 of plate 1. This member 20a has a U-shaped section in its central portion for serving as a guide for the spring leaf 18a and compelling it to conform to the curvature of the end 2 of plate 1. The end of the spring leaf 18a is bent down at 18b in order to be secured, by screws 22a, or the like, on the frame 23 of the glass plate to be operated. The other parts of the wind-shield lifting device and the operation remain the same as in the first form of construction described above, and, from this fact, they will not be described again.

The present invention is not limited to the forms of construction described above and illustrated, but it extends to all those utilizing the features above set forth and allowing to obtain the desired result.

What I claim as my invention and desire to secure by Letters Patent is:

1. In a window-lifting device particularly applicable to the operation of the pivoting glass plates constituting the windshield of motor vehicles, the combination with the glass plate, of a support, a slide-block guided in an aperture of said support for moving substantially according to a direction at right angles to and meeting the pivoting axis of the glass plate, a flexible member secured, on the one hand, to the glass plate on the side opposed to that according to which said glass plate is pivoted and, on the other hand, to said slide-block, a screw threaded rod screwed in a suitable screw threaded hole of the slide-block, a bearing secured on said support and in which the screw threaded rod is journalled, the bearing being provided with a slot substantially at right angles to the axis of said screw threaded rod which is provided, opposite this slot, with a circumferential groove, a U-shaped yoke fitting into the slot of said bearing and the branches of which extend into the circumferential groove on either side of the screw threaded rod in order to axially hold the latter, means for guiding said flexible member and which are constituted by one of the suitably curved ends of said support and by a member having a U-shaped cross section, which is curved in order to be secured on the curved end of said support and to thus embrace said flexible member for causing the latter to take a direction substantially at right angles to said pivoting glass plate.

2. In a window-lifting device particularly applicable to the operation of the pivoting glass plates constituting the windshield of motor vehicles, the combination with the glass plate, of a support, a slide-block guided in an aperture of said support for moving substantially according to a direction at right angles to and meeting the pivoting axis of the glass plate, a helical spring, the turns of which are in contact with each other and secured, on the one hand to the glass plate on the side opposed to that according to which said glass plate is pivoted and, on the other hand, to said slide-block, a screw threaded rod screwed in a suitable screw threaded hole of the slide-block, a bearing secured on said support and in which the screw threaded rod is journalled, the bearing being provided with a slot substantially at right angles to the axis of said screw threaded rod which is provided, opposite this slot, with a circumferential groove, a U-shaped yoke fitting into the slot of said bearing and the branches of which extend into the circumferential groove on either side of said screw threaded rod, in order to axially hold the latter, means for guiding said spring and which are constituted by one of the ends, suitably curved, of said support and by a member having a U-shaped cross section, which is curved, in order to be secured on the curved end of said support and to thus embrace said spring for causing the latter to take a direction substantially at right angles to said pivoting glass plate.

3. In a window-lifting device particularly applicable to the operation of the pivoting glass plates constituting the windshield of motor vehicles, the combination, with the glass plate, of a support, a slide-block guided in an aperture of said support for moving substantially according to a direction at right angles to and meeting the pivoting axis of the glass plate, a spring leaf having a slightly arcuate section and secured, on the one hand, to the glass plate on the side opposed to that according to which said glass plate is pivoted and, on the other hand, to said slide-block, a screw threaded rod screwed in a suitable screw threaded hole of the slide-block, a bearing secured on said support and in which the screw threaded rod is journalled, the bearing being provided with a slot substantially at right angles to the axis of said screw threaded rod which is provided, opposite this slot, with a circumferential groove, a U-shaped yoke fitting into the slot of said bearing and the branches of which extend into the circumferential groove on either side of said screw threaded rod, in order to axially hold the latter, means for guiding said spring leaf and which are constituted by one of the ends, suitably curved, of said support and by a member having a U-shaped cross section, which is curved, in order to be secured on the curved end of said support and to thus embrace said spring leaf for causing the latter to take a direction substantially at right angles to said pivoting glass plate.

CHARLES HILAIRE HENRI RODANET.